(12) United States Patent
Huang et al.

(10) Patent No.: US 9,204,301 B2
(45) Date of Patent: Dec. 1, 2015

(54) DEPLOYING WIRELESS DOCKING AS A SERVICE

(71) Applicant: QUALCOMM Incorporated, San Diego, CA (US)

(72) Inventors: Xiaolong Huang, San Diego, CA (US); Andrew Mackinnon Davidson, Monte Sereno, CA (US); Rolf De Vegt, San Francisco, CA (US); Olivier Jean Benoit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 14/023,205

(22) Filed: Sep. 10, 2013

(65) Prior Publication Data

US 2014/0196112 A1    Jul. 10, 2014

Related U.S. Application Data

(60) Provisional application No. 61/749,170, filed on Jan. 4, 2013, provisional application No. 61/768,063, filed on Feb. 22, 2013.

(51) Int. Cl.
| | |
|---|---|
| H04W 12/06 | (2009.01) |
| H04W 48/08 | (2009.01) |
| G06F 1/16 | (2006.01) |
| H04L 29/06 | (2006.01) |

(Continued)

(52) U.S. Cl.
CPC ............. *H04W 12/06* (2013.01); *G06F 1/1632* (2013.01); *H04L 63/083* (2013.01); *H04W 48/08* (2013.01); *H04W 76/023* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,019,883 B1 * | 9/2011 | Margulis ..................... 709/231 |
| 8,254,992 B1 * | 8/2012 | Ashenbrenner et al. ...... 455/557 |
| 2006/0233191 A1 | 10/2006 | Pirzada et al. | |

(Continued)

FOREIGN PATENT DOCUMENTS

EP    1887730 A1    2/2008

OTHER PUBLICATIONS

International Search Report and Written Opinion—PCT/US2013/071744—ISA/EPO—Mar. 19, 2014 (12 pgs.).

(Continued)

*Primary Examiner* — Samson Lemma
*Assistant Examiner* — Abdulhakim Nobahar
(74) *Attorney, Agent, or Firm* — Shumaker & Sieffert, P.A.

(57) ABSTRACT

A method includes establishing, by a wireless docking center, a secure wireless communication connection with a wireless dockee, receiving, by the wireless docking center, from the wireless dockee, an ASP session request for a wireless docking service of the wireless docking center, receiving, by the wireless docking center, from the wireless dockee, a passphrase for authenticating with the wireless docking service, determining, by the wireless docking center, whether the wireless dockee is authorized to access the wireless docking service based on the received passphrase, responsive to determining that the wireless dockee is not authorized to access the wireless docking service, denying, by the wireless docking center, the wireless dockee access to the wireless docking service, and responsive to determining that the wireless dockee is authorized to access the wireless docking service, granting, by the wireless docking center, the wireless dockee access to the wireless docking service.

41 Claims, 7 Drawing Sheets

(51) Int. Cl.
 *H04W 76/02* (2009.01)
 *H04W 84/18* (2009.01)

(56) References Cited

U.S. PATENT DOCUMENTS

| | | |
|---|---|---|
| 2010/0293219 A1 | 11/2010 | Pohjanen |
| 2012/0099566 A1 | 4/2012 | Laine et al. |
| 2012/0131353 A1* | 5/2012 | Nasir et al. .................... 713/189 |
| 2012/0243524 A1 | 9/2012 | Verma et al. |
| 2012/0265913 A1 | 10/2012 | Suumaeki et al. |
| 2012/0322368 A1 | 12/2012 | Desai et al. |
| 2013/0016629 A1 | 1/2013 | Mallik et al. |
| 2013/0064175 A1 | 3/2013 | Pandey et al. |
| 2013/0100855 A1 | 4/2013 | Jung et al. |
| 2014/0075075 A1* | 3/2014 | Morrill et al. ................. 710/303 |

OTHER PUBLICATIONS

"Wi-Fi Peer-to-Peer (P2P) Technical Specification," Wi-Fi Alliance Technical Committee P2P Task Group, version 1.1, 2010, pp. 1-159.
U.S. Appl. No. 14/023,217, filed Sep. 10, 2013, by Xialong Huang.
HP xb4000 Media Notebook Docking Station—HP, Apr. 2008, http://www.hp.com/ctg/Manual/c01621869.pdf.

\* cited by examiner

DEPLOYING WIRELESS DOCKING AS A SERVICE

TECHNICAL FIELD

This application claims priority to U.S. Provisional Application No. 61/768,063, filed Feb. 22, 2013, and U.S. Provisional Application No. 61/749,170, filed Jan. 4, 2013, the entire content of each of which is incorporated herein by reference.

TECHNICAL FIELD

This disclosure relates to techniques for wireless docking between electronic devices.

BACKGROUND

Docking stations, which may also be referred to as "docks," are sometimes used to couple electronic devices such as laptop computers to peripherals such as monitors, keyboards, mice, printers, or other types of input or output devices. These docking stations typically require a physical connection between the electronic device and the docking station. Additionally, the electronic device and the docking station typically establish docking communications before docking functions may be used.

SUMMARY

The techniques of this disclosure provide techniques for authenticating wireless dockees and enforcing access control restrictions to services, such as a wireless docking service, of a wireless docking center and/or one or more peripheral function services implemented using an application service platform (ASP). In some examples, the wireless dockee may provide a passphrase to the wireless docking center as part of an ASP session request, such as an SESSION_REQUEST message.

In one example, this disclosure describes a method that includes establishing, by a wireless docking center, a secure wireless communication connection with a wireless dockee, receiving, by the wireless docking center, from the wireless dockee, an ASP session request for a wireless docking service of the wireless docking center, and receiving, by the wireless docking center, from the wireless dockee, a passphrase for authenticating with the wireless docking service. The method further includes determining, by the wireless docking center, whether the wireless dockee is authorized to access the wireless docking service based on the received passphrase, responsive to determining that the wireless dockee is not authorized to access the wireless docking service, denying, by the wireless docking center, the wireless dockee access to the wireless docking service, and responsive to determining that the wireless dockee is authorized to access the wireless docking service, granting, by the wireless docking center, the wireless dockee access to the wireless docking service.

In another example, this disclosure describes a method comprising establishing, by a wireless dockee, a secure wireless communication connection with a wireless docking center, and transmitting, by the wireless dockee, to the wireless docking center, an ASP session request for a wireless docking service of the wireless docking center. The method further includes transmitting, by the wireless dockee, to the wireless docking center, a passphrase for authenticating with the wireless docking service, and accessing the wireless docking service.

In one example, this disclosure describes a wireless docking center that includes at least one processor, and a memory. The at least one processor may be configured to establish a secure wireless communication connection with a wireless dockee, receive from the wireless dockee, an ASP session request for a wireless docking service of the wireless docking center, receive from the wireless dockee, a passphrase for authenticating with the wireless docking service, determine whether the wireless dockee is authorized to access the wireless docking service based on the received passphrase, responsive to determining that the wireless dockee is not authorized to access the wireless docking service, deny the wireless dockee access to the wireless docking service, and responsive to determining that the wireless dockee is authorized to access the wireless docking service, grant the wireless dockee access to the wireless docking service.

In one example, this disclosure describes a wireless dockee that includes at least one processor, and a memory. The at least one processor may be configured to establish a secure wireless communication connection with a wireless docking center. The wireless dockee is further configured to transmit to the wireless docking center, an ASP session request for a wireless docking service of the wirelesticating with the wireless docking service, and access the wireless docking service.

In another example, this disclosure describes a method capable of being performed by a wireless docking center, the method comprising establishing, by a wireless docking center, a secure wireless communication connection with a wireless dockee, receiving, by the wireless docking center, from the wireless dockee, an ASP session request for a wireless docking service of the wireless docking center, and receiving, by the wireless docking center, from the wireless dockee, a passphrase for authenticating with the wireless docking service. The method further includes determining, by the wireless docking center, whether the wireless dockee is authorized to access the wireless docking service based on the received passphrase, responsive to determining that the wireless dockee is not authorized to access the wireless docking service, denying, by the wireless docking center, the wireless dockee access to the wireless docking service, and responsive to determining that the wireless dockee is authorized to access the wireless docking service, granting, by the wireless docking center, the wireless dockee access to the wireless docking service.

In another example, this disclosure describes a method capable of being performed by a wireless docking center, the method establishing, by a wireless dockee, a secure wireless communication connection with a wireless docking center, and transmitting, by the wireless dockee, to the wireless docking center, an ASP session request for a wireless docking service of the wireless docking center. The method may further include transmitting, by the wireless dockee, to the wireless docking center, a passphrase for authenticating with the wireless docking service, and accessing the wireless docking service.

In another example, this disclosure describes a non-transitory computer-readable storage medium comprising instructions, that, when executed, cause one at least one processor to: establish a secure wireless communication connection with a wireless dockee, receive, from the wireless dockee, an ASP session request for a wireless docking service of the wireless docking center, receive, from the wireless dockee, a passphrase for authenticating with the wireless docking service, determine whether the wireless dockee is authorized to access the wireless docking service based on the received passphrase, responsive to determining that the wireless dockee is not authorized to access the wireless docking service, deny the wireless dockee access to the wireless docking service, and responsive to determining that the wireless dockee is authorized to access the wireless docking service, grant the wireless dockee access to the wireless docking service.

In another example, this disclosure describes a non-transitory computer-readable storage medium comprising instructions, that, when executed, cause at least one processor to: receive an ASP session request for a peripheral function service associated with a peripheral that is communicatively coupled with the wireless docking center, receive a passphrase for authenticating with the requested peripheral function service, determine whether the wireless dockee is authorized to access the peripheral function service based on the received passphrase for the peripheral function service, establish a session of the peripheral function service responsive to determining that the wireless dockee is authorized to access the wireless docking service, and deny access to the peripheral function service responsive to determining that wireless dockee is not authorized to access the wireless docking service.

In another example, this disclosure describes an apparatus means for establishing a secure wireless communication connection with a wireless dockee, means for receiving from the wireless dockee, an ASP session request for a wireless docking service of the wireless docking center, means for receiving from the wireless dockee, a passphrase for authenticating with the wireless docking service, means for determining whether the wireless dockee is authorized to access the wireless docking service based on the received passphrase, means for denying, by the wireless docking center, the wireless dockee access to the wireless docking service responsive to determining that the wireless dockee is not authorized to access the wireless docking service, and means for granting, by the wireless docking center, the wireless dockee access to the wireless docking service responsive to determining that the wireless dockee is authorized to access the wireless docking service.

In another example, this disclosure describes an apparatus means for establishing a secure wireless communication connection with a wireless docking center, means for transmitting, to the wireless docking center, an ASP session request for a wireless docking service of the wireless docking center, means for transmitting, to the wireless docking center, a passphrase for authenticating with the wireless docking service, and means for accessing the wireless docking service.

The details of one or more examples are set forth in the accompanying drawings and the description below. Other features, objects, and advantages will be apparent from the description and drawings, and from the claims.

DETAILED DESCRIPTION

Figure 1:
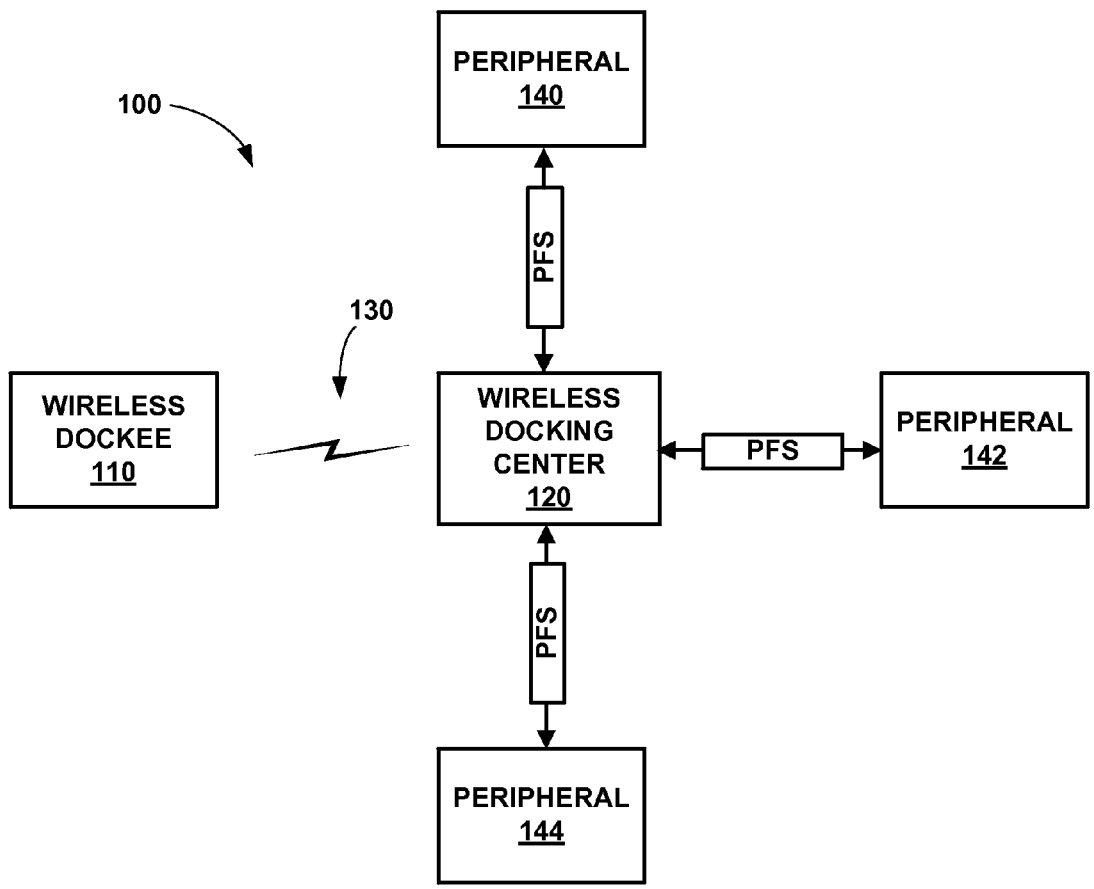
FIG. 1 is a conceptual diagram illustrating an example wireless docking environment in which a wireless dockee (WD) communicates with a wireless docking center (WDC) over a wireless communication link in accordance with examples of this disclosure.

As described in greater detail below, this disclosure describes wireless communication techniques, protocols, methods, and devices applicable to a docking system environment in which authentication for wireless docking may function using a wireless docking service (WDS) operating through an Application Service Platform (ASP). In wireless docking, a wireless docking station may advertise and/or provide various wireless docking services to a client computing device, referred to as a "dockee" using a wireless communication link.

The WDS and the ASP may be implemented in Wi-Fi communications, and the wireless docking service on top of the ASP may be implemented as a Wi-Fi docking service or a wireless docking service using a subset of Wi-Fi docking. For example, the wireless docking service may use a subset of Wi-Fi docking standards directed to peer-to-peer (P2P) topology, generally in accordance with the set of standards promoted as "Wi-Fi Direct" by the Wi-Fi Alliance.

An ASP is generally a wireless communications stack that may enable devices to easily advertise, seek and provide services over a wireless network, such as a Wi-Fi Direct certified network. More particularly, the ASP stack provides common communications and messaging that enable service discovery and session creation. The wireless stack forming the ASP may be implemented to comply with Wi-Fi Direct certification. The remainder of this disclosure makes regular reference to the example of a wireless docking service (WDS) implemented for operating through a Wi-Fi Direct ASP, that is, a wireless ASP implemented to comply with Wi-Fi Direct certification, as one illustrative example of a wireless docking service of this disclosure. This is done with the understanding that a WDS operating through Wi-Fi Direct ASP is merely one example, and a WDS may also be implemented in accordance with a variety of wireless standards, protocols, and technologies. For example, a WDS may also be implemented in accordance with WiGig and/or one or more of the Institute of Electrical and Electronics Engineers (IEEE) 802.11 set of standards (e.g., 802.11, 802.11a, 802.11b, 802.11g, 802.11n, 802.11ac, 802.11ad, etc.), or extensions of Wi-Fi, WiGig, and/or one or more 802.11 standards.

A wireless docking service operating on top of the ASP may enable wireless docking centers (WDCs), to advertise their specific docking services. A WDS operating on top of the ASP may also enable wireless dockee devices, i.e., WDs or dockees, to search for WDCs that provide docking services. A WDS operating on top of the ASP may also enable WDCs and wireless dockees to connect to each other and establish a wireless docking sessions for advertised services with each other. The wireless docking session may enable services referred to as peripheral function services (PFSs), provided by peripheral devices that are coupled to the WDC. For example, the peripherals may include displays, projectors, speakers, keyboards, mice, joysticks, data storage devices, network interface devices, other docking hosts, remote controls, cameras, microphones, printers, or other devices. Such peripheral devices may include stand-alone devices or components of devices such as other computers, in different examples. A wireless dockee device, such as a mobile handset, may wirelessly dock with a wireless docking center using the WDS operating through the ASP, thereby enabling the wireless dockee device to access peripheral function services provided via the wireless docking center by any of the peripherals, in some examples.

The techniques of this disclosure are related to techniques for authenticating dockees and controlling the access of a WD to peripheral function services of a wireless docking station using ASP communications. In particular, the administrator or owner of a wireless docking center may wish to restrict or limit access of a particular WD to a set of peripheral function services offered by the WDC. An administrator or owner of a WDC may also wish to authenticate wireless dockees that connect to the docking station, to ensure that only authorized users of authorized wireless dockees may connect to the wireless docking service.

FIG. 1 is a conceptual diagram of an example wireless docking environment 100 in which a wireless dockee (WD) 110 communicates authenticates with a wireless docking center (WDC) 120 over a wireless communication link 130. Wireless dockee 110 is a mobile device configured for wireless docking and referred to as a wireless dockee in the context of a wireless docking environment 100. Wireless dockee 110 may be a mobile device such as a smartphone or other mobile handset, a tablet computer, a laptop computer, or other electronic device. Wireless dockee 110 may also be a component of a larger device or system. For example, wireless dockee 110 may comprise a processor, a processing core, a chipset, or another type of one or more integrated circuits.

Wireless docking center 120 (which may also be referred to as a wireless docking station or wireless docking hub) is communicatively coupled with various peripheral devices 140, 142, 144. Each of peripherals 140, 142, and 144 may be associated with a peripheral function service (PFS). Each peripheral function service may enable wireless communication with one of peripherals 140, 142, 144 over communication link 130.

Wireless docking center 120 may advertise or otherwise make accessible to wireless dockee 110, the one or more peripheral services using an application services platform. Wireless docking center 120 may be a wireless docking host device that serves as a connectivity agent within a computing environment. Wireless docking center 120 may be a dedicated wireless dock, or may also be implemented in a smartphone or other mobile handset, a tablet computer, a laptop computer, or other electronic device, or as a component, subsystem, or one or more integrated circuits included as part of a larger device or system of any of the above.

Peripheral devices 140, 142, 144 may include displays, projectors, speakers, keyboards, mice, joysticks, data storage devices, network interface devices, other docking hosts, remote controls, cameras, microphones, printers, or any of various other devices capable of communication with wireless docking center 120. Peripheral devices 140, 142, 144 may also all be coupled to wireless docking center 120 via wireless communication links. Some peripheral devices may also be coupled to docking center 120 via wired communication links, in some examples. Wireless docking center 120 may abstract the functions of individual peripheral devices 140, 142, 144 as wireless docking services.

Wireless communication link 130 may be any wireless link capable of propagating communicative signals between wireless dockee 110 and wireless docking center 120. In some examples, wireless communication link 130 may be implemented in radio frequency communications in frequency bands such as the 2.4 gigahertz (GHz) band, the 5 GHz band, the 60 GHz band, or other frequency bands. In some examples, wireless communication link 130 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used for wireless communication link 130, such as the 2.4 GHz, 5 GHz, and 60 GHz bands, may be defined for purposes of this disclosure as they are understood in light of the standards of Wi-Fi, WiGig, any one or more IEEE 802.11 protocols, and/or other applicable standards or protocols.

Wireless dockee 110 may seek, and wireless docking center 120 may advertise a wireless docking service by transmitting ASP messages using communication link 130. The ASP messages may be messages, such as UDP datagrams, sent using the Wi-Fi Direct Services communications protocol. Communications transmitted over communication link 130 may be secured using a wireless security protocol, such as Wireless Protected Access (WPA) or Wireless Protected Access II (WPA2). Once secure link layer communications are established, wireless dockee 110 and wireless docking center 120 engage in ASP service discovery, and ASP session creation for the wireless docking service, and for the peripheral function services.

To perform service discovery and session creation, wireless dockee 110 and wireless docking center 120 may transmit a series of ASP messages using a variety of ASP method calls and/or events. ASP methods and events support service discovery and session creation for services that use the ASP, such a wireless docking service, and peripheral function services of wireless docking center 120. By utilizing the ASP, wireless services operating over communication link 130 and ASP-compatible service seeking devices, such as wireless dockee 110 may easily find (discover) and access the services of an ASP service advertiser (e.g. wireless docking center 120) using a standard communications or messages, rather than requiring each PFS to implement service advertisement and discovery functionality individually.

To access the wireless docking service, wireless dockee 110 and wireless docking center 120 determine whether wireless docking center 120 provides the wireless docking service. If wireless docking center 120 provides the wireless docking service that wireless dockee 110 seeks, wireless dockee 110 and wireless docking center 120 attempt to create a wireless docking service session for that service.

During session creation for the wireless docking service, wireless dockee 110 transmits a session request, which may include secret data, which may comprise a passphrase, a token, authentication data, and/or encrypted data, to wireless docking center 120. Wireless docking center 120 may receive the session request that includes the passphrase and compare the passphrase with one or more stored passphrases to determine whether wireless dockee 110 is authorized to access the wireless docking service. Each passphrase may be associated with one or more dockees. Responsive wireless dockee 110 is not authorized to access the wireless docking service, wireless docking center 120 denies wireless dockee 110 access to the wireless docking service.

Responsive to determining that wireless dockee 110 is authorized to access the wireless docking service, wireless docking center 120 may acknowledge that access has been granted to the WDS, and establishes a WDS session. Once the WDS session is established, wireless docking center 120 may optionally transmit passphrases for one or more of the peripheral function services to wireless dockee 110 over communication link 130. Alternatively, wireless dockee 110 may have stored or cached the passphrases for the PFSs.

Responsive to establishing the WDS session, wireless dockee 110 may perform service discovery and attempt to establish a session for a PFS. As part of attempting to establish the session, wireless dockee 110 may transmit a session request to wireless docking center 120 that includes a passphrase associated with the PFS. Wireless docking center 120 may receive the session request, and responsive to determining, that the passphrase matches a passphrase for that particular peripheral function service, wireless docking center 120 may acknowledge that the session has been created and establish the session. Once the session has been established, wireless dockee 110 may communicate with a peripheral, such as peripheral 140 using the associated PFS. Wireless dockee 110 may repeat the process of performing service discovery and session setup for any additional PFSs to wish wireless docking center 120 seeks to utilize.

In one example in accordance with the techniques of this disclosure, wireless docking center 120 may be configured to establish a secure wireless communication connection with wireless dockee 110, receive, from wireless dockee 110, an ASP session request for a wireless docking service of wireless docking center 120. Wireless docking center 120 may further be configured to receive from the wireless dockee, a passphrase for authenticating with the wireless docking service, determine whether the wireless dockee 110 is authorized to access the wireless docking service based on the received passphrase, responsive to determining that wireless dockee 110 is not authorized to access the wireless docking service, deny wireless dockee 110 access to the wireless docking service, and responsive to determining that the wireless dockee 110 is authorized to access the wireless docking service, grant wireless dockee 110 access to the wireless docking service In another example in accordance with the techniques of this disclosure, wireless dockee 110 may be configured to establish a secure wireless communication connection with wireless docking center 120, and transmit an ASP session request for a wireless docking service of the wireless docking center. Wireless dockee 110 may be further configured to transmit to the wireless docking center, a passphrase for authenticating with the wireless docking service, and access the wireless docking service.

Various examples related to implementing authentication for services using ASP in conjunction with a wireless docking service and/or peripheral function services have been described. More detailed flow diagrams illustrating the techniques of this disclosure are illustrated with respect to FIGS. 4-5.

Figure 2:
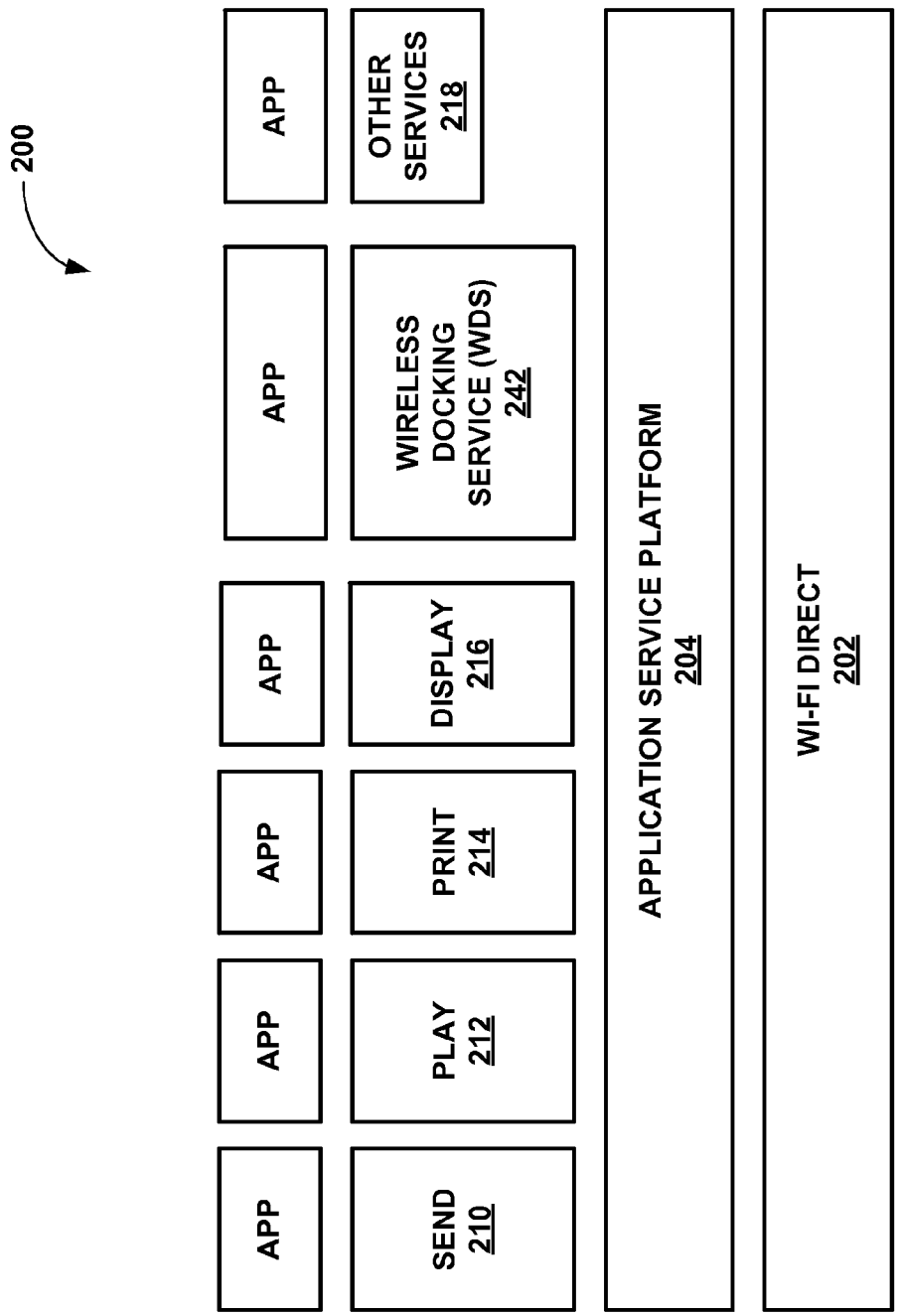
FIG. 2 is a conceptual diagram illustrating an example wireless docking communications stack including a wireless docking service (WDS) operating through an Application Service Platform (ASP) in accordance with examples of this disclosure.

FIG. 2 is a conceptual diagram illustrating an example wireless docking communications stack using a wireless Application Service Platform (ASP) 204 operating over Wi-Fi Direct wireless communications 202, in this example. Wi-Fi Direct communications 202 are an example implementation of wireless communications over which ASP 204 may operate. Various wireless services may be provided over the ASP 204, including a send service 210, a play service 212, a print service 214, a display service 216, and potentially other services 218. Each of these services 210, 212, 214, 216, 218 may have an application running on them. Each of these services 210, 212, 214, 216, 218 may be provided by one or more devices accessible through a wireless docking center 120 and managed via the ASP 204.

Wireless docking can also be implemented over the ASP 204 as a wireless docking service (WDS) 242. WDS 242 may be provided as a Wi-Fi Direct service, and referred to as a Wi-Fi Direct Docking Service. The Wi-Fi Direct Docking Service can be a subset of Wi-Fi docking, in particular, a subset of Wi-Fi docking operating over a P2P Wi-Fi Direct topology, in the example of a Wi-Fi Direct implementation. WDS 242 may, for example, be implemented as a software module that may be loaded onto or stored in a device such as a wireless dockee 110 and/or a wireless docking center 120. Aspects of WDS 242 may also be integrated with, pre-packaged with, or implemented in hardware, in some examples. For example, WDS 242 may be stored on, integrate with, or implemented by an integrated circuit or a chipset containing one or more integrated circuits and one or more memory components. WDS 242 may manage aspects of wireless docking through ASP 204, as further depicted in FIG. 3.

In the example of FIG. 2, send service 210, play service 212, print service 214, and display service 216 may each be peripheral function services. Each of send service 210, play service 212, print service 214, and display service 216, may communicate with ASP 204 using method calls to advertise their services and to allow ASP 204 to create sessions for each of services 210, 212, 214, and 216. In some examples, ASP 204 may receive commands, function calls, and/or events from services 210, 212, 214, and 216, and translate them into an ASP method or event.

Wireless docking service 242 may provide a passphrase or credentials for each send service 210, play service 212, print service 214, and display service 216 to wireless dockee wireless dockee 110 responsive to determining that wireless dockee 110 is authorized to access WDS 242. Each of services 210, 212, 214, and 216 may be configured to receive the passphrase from WDS 242, and responsive to receiving the supplied passphrase from wireless dockee 110, create a session of the PFS.

Figure 3:
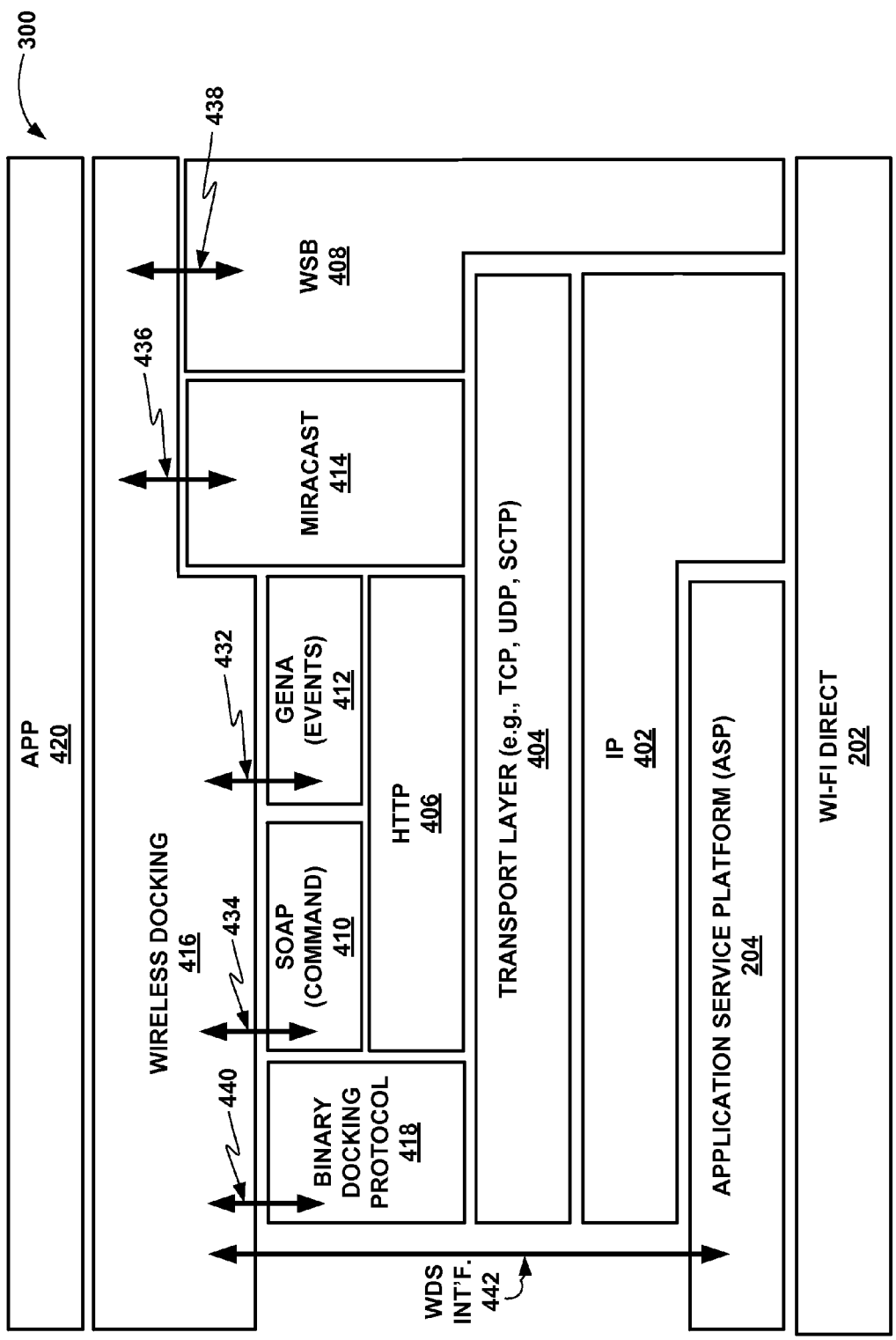
FIG. 3 is a conceptual diagram illustrating an example communications stack for a WDS operating through an ASP in accordance with examples of this disclosure.

FIG. 3 is a conceptual diagram illustrating an example wireless docking service communications stack 300 in accordance with one or more examples of this disclosure, in particular, including a WDS Interface 442. The wireless docking service communications stack 300 may have the components and protocol stack depicted in the example of FIG. 2. WDS Interface 442 enables a WDS 242 (e.g., a Wi-Fi Direct Docking Service) for enabling wireless docking communications 416 directly through an ASP 204.

In the example of FIG. 3, the Application Service Platform (ASP) 204 functions on top of Wi-Fi Direct 202, and various components and aspects of wireless docking may function on top of the ASP 204 and Wi-Fi Direct 202 (both as described above in reference to FIG. 2). A packet-based transport layer protocol stack may run on top of ASP 204, which may include Internet Protocol (IP) communications 402, and one or more of various Transport Layer communications 404 run on top of IP communications 402. IP communications 402 may run on top of ASP 204, or directly on Wi-Fi Direct 202, as depicted in FIG. 3. Transport Layer communications 404 may include and one or more of Transmission Control Protocol (TCP), User Datagram Protocol (UDP), Stream Control Transmission Protocol (SCTP), or other Transport Layer communication protocols. For example, HTTP 406 and WiFi Serial Bus (WSB) 408 may run on top of TCP/IP, while Miracast 414 may run on top of UDP/IP, and WSB 408 may also run either on top of TCP/IP or directly over Wi-Fi Direct 202, as depicted in FIG. 3.

Plaintext communication payloads including simple object access protocol (SOAP) commands 410 and General Event Notification Architecture (GENA) event notifications 412 may be sent over HTTP 406. Communication payloads may also be implemented in a binary wireless docking protocol 418 that runs directly on the Transport Layer 404. Wireless docking communications 416 may be sent on any of SOAP 410, GENA 412, binary docking protocol 418, or WSB 408. Various kinds of devices or various services may use any one or more of these docking communication channels for exchanging wireless docking communications. Application communications 420 may be sent over docking communications 416.

Communications stack 300 includes several communication interfaces between different components of communications stack 300. WDS Interface 442 between ASP 204 and docking 416 serves as a wireless docking interface for ASP methods and events. WDS Interface 442 may implement WDS 242 running directly on ASP 204 to manage wireless docking communications.

Various other communication interfaces are also included in wireless docking communications stack 300. Communication interface 432 between GENA 412 and docking 416 serves as an interface for docking protocol event messages. Communication interface 434 between SOAP 410 and docking 416 serves as an interface for docking protocol command messages. Communication interface 436 between Miracast 414 and docking 416 serves as an interface for Miracast operations. Communication interface 438 between WiFi Serial Bus (WSB) 408 and docking 416 serves as an interface for WiFi Serial Bus operations. Communication interface 440 between binary docking protocol 418 and docking 416 serves as an interface for binary docking protocol operations.

As noted above, WDS Interface 442 may implement WDS 242 running directly on ASP 204 to manage wireless docking communications. Further details of WDS Interface 442 implementing WDS 242 to manage wireless docking communications between a wireless docking center 120 and a wireless dockee 110 are described in reference to FIG. 4.

Figure 4:
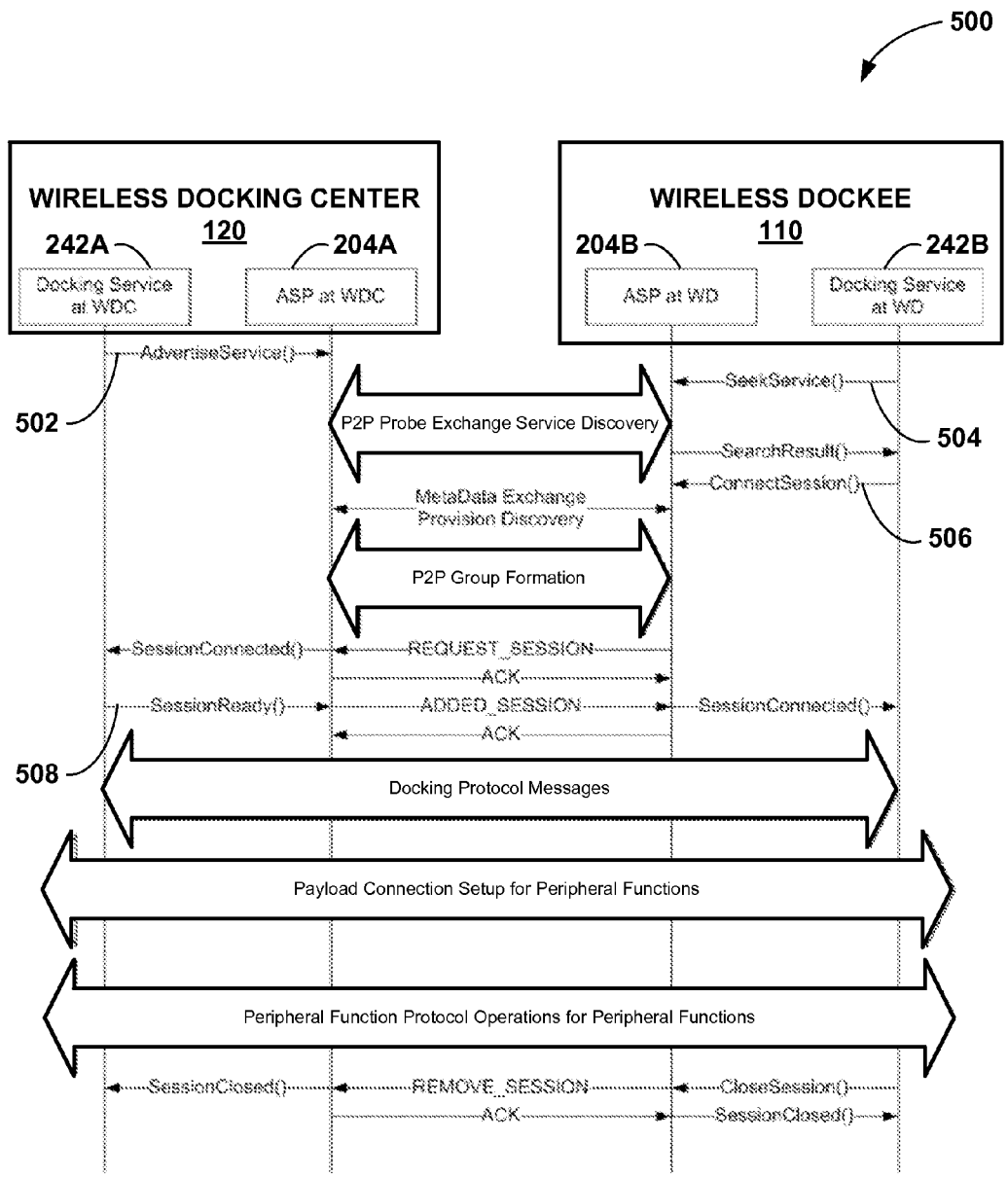
FIG. 4 is a communication diagram illustrating a flow for an example procedure for a wireless docking center and a wireless dockee to exchange wireless communications with each other using a WDS operating through an ASP, in accordance with examples of this disclosure.

FIG. 4 is a communication diagram illustrating a flow 500 for an example procedure for a wireless docking center 120 and a wireless dockee 110 to exchange wireless communications with each other for advertising, seeking, establishing, operating, and tearing down a wireless docking session with each other using a wireless Application Service Platform (ASP), in accordance with one or more examples of this disclosure. In the example of FIG. 4, wireless docking center 120 and wireless dockee 110 are each configured to operate both a wireless docking service (WDS) 242 and an ASP 204. The WDS 242 may communicate directly through the ASP 204 via the WDS Interface 442 as shown in FIG. 3. In particular, wireless docking center 120 may be configured to operate wireless docking service 242A through ASP 204A, and wireless dockee 110 may be configured to operate wireless docking service 242B through ASP 204B. Wireless docking service 242A may manage wireless docking communications for wireless docking center 120 through ASP 204A, and wireless docking service 242B may manage wireless docking communications for wireless dockee 110 through ASP 204B.

Once wireless dockee 110 and wireless docking center 120 establish secure link-layer communications using one or more channels, wireless docking center 120 may initially use WDS 242A to generate communications to advertise wireless docking services through ASP 204A. Wireless dockee 110 may initially use WDS 242B to generate communications to search for wireless docking services through ASP 204B. Wireless docking center 120 and wireless dockee 110 may then use WDS 242A and WDS 242B, operating through ASP 204A and ASP 204B, respectively, to set up a wireless docking session with each other for one or more wireless docking services. Once the wireless docking session is set up, wireless docking center 120 and wireless dockee 110 may exchange docking protocol messages through the IP transport 402 and Transport Layer 404 of the ASP session. All wireless docking service operations may be defined by the wireless docking protocol. Operations that drive the use of peripheral functions may not require any interaction with the ASP 204. These functions are described in more detail as follows.

As shown in the flow in FIG. 4, WDS 242A of wireless docking center 120 may initially engage in P2P probe exchange and service discovery. To begin probe exchange and service discovery, wireless docking center 120 may generate an AdvertiseService( ) communication 502. WDS 242A communicates the AdvertiseService( ) communication 502 to ASP 204A of wireless docking center 120 to manage its communications external to wireless docking center 120. WDS 242A may structure the AdvertiseService( ) communication 502 in the form of AdvertiseService (service_name, port, proto, share, auto_accept, service_information), where service_name, port, porto, share, auto_accept, and service_information are arguments of the AdvertiseService method. The service_name argument may be org.wi-fi.directsvcs-docking.wdc. The port may be a port number for docking protocol messages at the docking center. The proto (protocol) argument, which indicates the protocol used to transmit data for the WDS may be set to 6 for TCP. The auto_accept argument, which indicates whether a docking center automatically accepts a connection request, may be set to false to let the docking protocol process the information in the service request from a wireless dockee 110. The service_information argument may include information related to the wireless docking services, and may indicate associated peripheral functions (such as mouse, keyboard), availabilities of peripheral functions (such as occupied, available), peripheral function protocols that can be used to support the peripheral functions (such as Wi-Fi Display (WFD), WiFi Serial Bus (WSB)), payload connections that can be used to support peripheral functions (such as physical layer (PHY) specification, operating channels, peer-to-peer (P2P) group roles), docking profiles that can be supported (such as office docking, A/V entertainment), or other information on wireless docking services.

As part of the P2P probe exchange and service discovery, WDS 242B of wireless dockee 110 may initially generate a SeekService( ) communication 504. The SeekService( ) communication is used to search for certain services. WDS 242B communicates the SeekService( ) communication 504 to ASP 204B of wireless dockee 110 to manage its communications external to wireless dockee 110. WDS 242B may structure the SeekService( ) communication 504 in the form of SeekService(service_name, exact_search, mac_address, service_information_request), where service_name, exact_search, mac_address, and service_information_request are arguments or parameters of the SeekService method.

The service_name argument contains the name of the service that wireless dockee 110 is seeking. In accordance with the techniques of this disclosure, the service_name argument may be org.wi-fi.directsvcsdocking.wdc when searching for a Wi-Fi Direct docking service. In some examples, the service_name argument may be a prefix of a service name, depending on the value of the exact_search argument.

The exact_search argument defines whether ASP 204 sends a hash of the service name. If exact_search is true, then ASP 204 sends a hash of the service. If exact_search is false, ASP 204 does not send a hash. The mac_address parameter contains the MAC address of a P2P device if services are being sought from that particular device. The MAC address argument is blank if the ASP is to search for the sought service on all proximally located Wi-Fi direct devices. The service_information_request argument may include a list of strings that identify the requests to include peripheral function information and docking profile information.

As shown in FIG. 4, ASP 204A and ASP 204B manage wireless communications between wireless docking center 120 and wireless dockee 110 after WDS 242A and WDS 242B generate the communications advertising and seeking wireless docking services, respectively. In particular, communications between wireless docking center 120 and wireless dockee 110 may take the form of P2P Probe Exchange Service Discovery, which may result in ASP 204B communicating a SearchResult( ) message to WDS 242B at wireless dockee 110.

WDS 242B at wireless dockee 110 may then request a docking service from wireless docking center 120 by sending a ConnectSession( ) communication 506. In particular, WDS 242B may structure the ConnectSession( ) communication 506 in the form of ConnectSession(service_mac, advertisement_id, session_information, network_role). The service_mac argument may specify a MAC address of the wireless docking center 120 as a search result. ASP 204A and ASP 204B may then manage further wireless communications between wireless docking center 120 and wireless dockee 110, including Metadata Exchange Provision, P2P Group Formation, and a Request_Session message from wireless dockee 110 to wireless docking center 120.

In accordance with the techniques of this disclosure, the REQUEST_SESSION message may include opcode, sequence number, session_mac, session_id, advertisement_id, session_information_length, session_information, and passphrase arguments. In various examples, the opcode argument may have a value of 0x00. The sequence number may have a sequence value assigned at transmission time. The session_mac argument has the value of the MAC address used in combination with the session_id and is used to identify the current ASP session. The session_id is the value of the ID that identifies the ASP session. The advertisement_id value is an identifier that references a service advertised by wireless docking center 120. The session_information_length argument is the length (in number of octets) of the session_information, and the session_information parameter is a variable-length parameter that includes session_information data if received in the ConnectSessions method.

In accordance with the techniques of this disclosure, the REQUEST_SESSION method may also include a passphrase argument. The value of the passphrase argument is a passphrase that wireless dockee 110 uses to authenticate with wireless docking. In some examples, wireless dockee 110 may transmit the passphrase argument to wireless docking center 120 in one or more docking protocol messages.

As described above, wireless docking center 120 authenticates wireless dockee 110 with wireless docking service 242A based on the supplied passphrase. Wireless docking center 120 may also authenticate and/or identify wireless dockee 110 based on the MAC address of wireless dockee 110. For example, if wireless docking center 120 determines that the passphrase received from wireless dockee 110 matches a passphrase stored at wireless docking center 120 that is associated with the MAC address of wireless dockee 110, wireless docking center 120 may grant wireless dockee 110 access to wireless docking service 242A. Granting access to wireless docking service 242A may result in may result in ASP 204A communicating a SessionConnected( ) message to WDS 242A at wireless docking center 120.

WDS 242A at wireless docking center 120 may inform ASP 204A that a docking service is ready by generating a SessionReady( ) communication 508. WDS 242A may structure the SessionReady( ) communication 508 in the form of SessionReady(session_mac, session_id). WDS 242A of wireless docking center 120 may send the SessionReady( ) communication after confirming that an incoming service port has been bound. The session_mac argument may specify the Media Access Control (MAC) address of a wireless dockee 110 to be served. The session_id argument may specify a session identifier for an available session accessing the service. Once ASP 204A receives the SessionReady( ) communication 508 from WDS 242A, ASP 204A may inform ASP 204B by communicating an Added Session message. ASP 204B may respond to this message by providing a SessionConnected( ) communication to WDS 242B at wireless dockee 110.

With the session connection messages exchanged, WDS 242A and WDS 242B may go on to exchange wireless docking protocol messages with each other. In some examples, wireless dockee 110 may transmit a passphrase to wireless docking center 120 using one or more docking protocol messages, and wireless docking center 120 may authenticate wireless dockee 110 based on the transmitted passphrase. Wireless docking services 242A and 242B may perform payload connection setup for peripheral functions (e.g. peripheral function services) and peripheral function protocol operations for peripheral functions. WDS 242A and WDS 242B may manage the peripheral function services on behalf of various other components or functions of wireless dockee 110, wireless docking center 120, and/or peripherals or other devices connected to them. Once the wireless docking session is finished, WDS 242A and WDS 242B may manage teardown of the session through ASP 204A and ASP 204B.

In some examples, before performing payload connection setup for peripheral function services, wireless docking center 120 may provide a passphrase to one or more of the peripheral function services, which wireless dockee 110 is authorized to access based on the passphrase supplied in the REQUEST_SESSION method or the docking protocol messages. Wireless docking center 120 may also transmit the passphrases for the one or more peripheral function services to wireless dockee 110 using ASP 204A.

Figure 5:
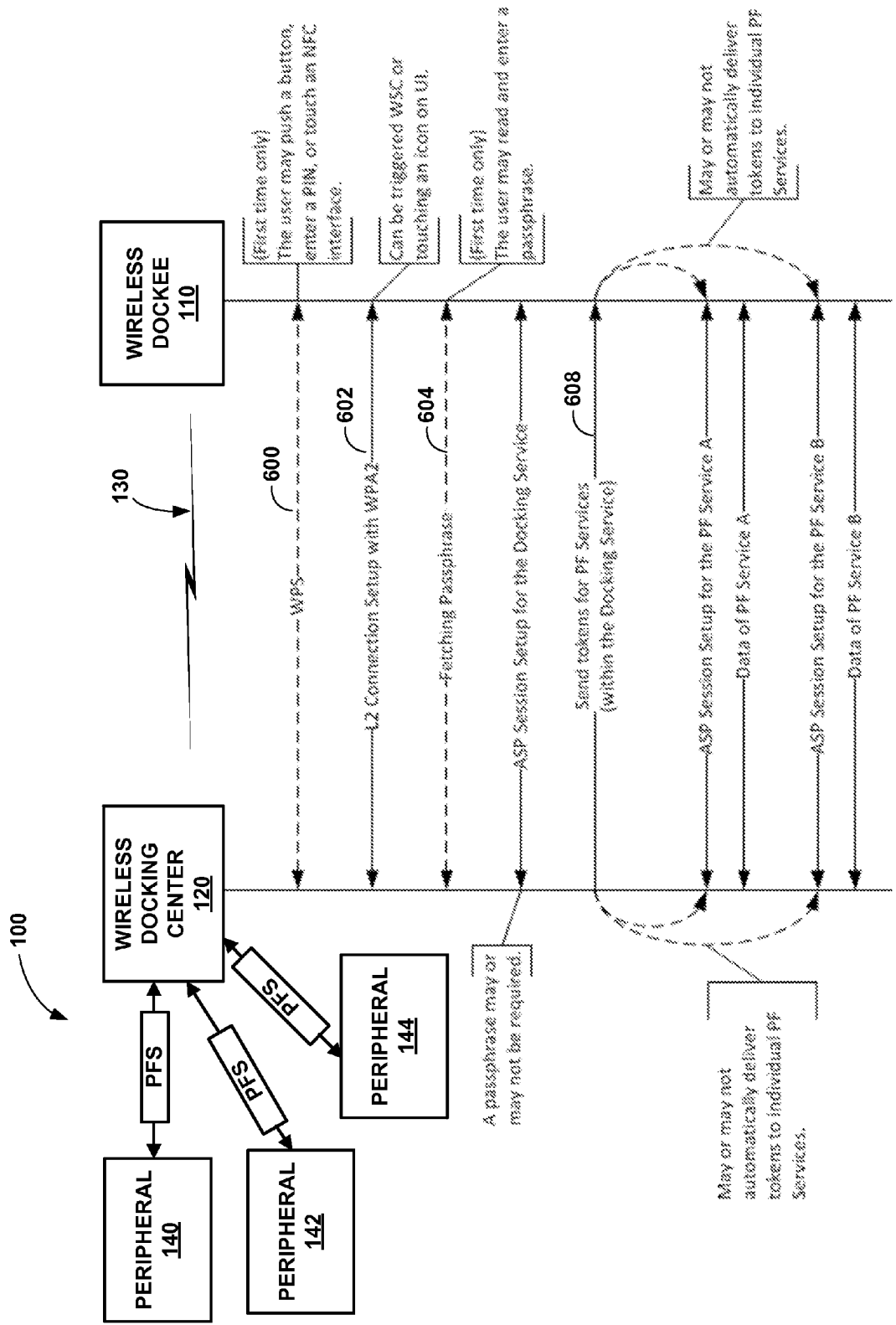
FIG. 5 is a communication diagram illustrating a flow for an example procedure for a wireless docking center and a wireless dockee to exchange wireless communications with each other using a WDS operating through an ASP, in accordance with examples of this disclosure.

FIG. 5 is a communication diagram illustrating a flow for an example procedure for a wireless docking center and a wireless dockee to exchange wireless communications with each other using a WDS operating through an ASP, in accordance with examples of this disclosure. In the example of FIG. 5, wireless docking center 120 is communicatively coupled to peripherals 140, 142, and 144. Wireless docking center 120 also implements an ASP, which may communicate with peripheral function services associated with each of peripherals 140, 142, and 144.

Wireless docking center 120 is communicatively coupled with wireless dockee 110 via wireless communication link 130. In one example in accordance with the techniques of this disclosure, to perform wireless docking, wireless dockee 110 and wireless docking center 120 may communicate with each other over wireless communication link 130 using a variety of ASP method calls and/or events.

In the example of FIG. 5, ASP method calls and/or events utilize the universal datagram protocol (UDP), which may be implemented on top of Internet Protocol (IP) to perform functions related to seeking a wireless docking service, setting up a wireless docking session, seeking individual peripheral function services, setting up peripheral function service sessions associated with each peripheral function service, and transmitting data using the peripheral function service sessions.

Initially, communications between wireless dockee 110 and wireless docking center 120, communications are secured using a form of link layer encryption credential generation, such as Wi-Fi protected setup (WPS) (600), in which wireless dockee 110 and wireless docking center 120 negotiate a PIN or pre-shared key (PSK) that is used to encrypt and decrypt link layer communications over communication link 130, the using Wi-Fi Protected Access (WPA) or Wi-Fi Protected Access II (WPA2) communication protocols. In some examples, wireless dockee 110 may receive the pre-shared key or PIN as a user input, or by using (near field communication) NFC communications resulting from touching wireless dockee 110 to wireless docking center 120 or an NFC tag.

Once wireless dockee 110 and wireless docking center 120 agree on a key to use for secure wireless communications, wireless dockee 110 and wireless docking center 120 setup secure link layer communications over communication link 130 (602) and engage in service discovery. During service discovery, wireless dockee 110 and wireless docking center 120 exchange messages to determine whether wireless dockee 110 offers a service that wireless docking center 120 seeks. In examples in accordance with the techniques of this disclosure, wireless dockee 110 may seek to utilize a wireless docking service.

Once wireless dockee 110 has determined that wireless docking center 120 offers a wireless docking service, wireless dockee 110 and wireless docking center 120 attempt to create a session for the wireless docking service. During session creation, wireless dockee 110 requests creation of the session using an ASP REQUEST_SESSION message. In accordance with the techniques of this disclosure, wireless dockee 110 may supply or include a passphrase in the REQUEST_SESSION message in order to authenticate with wireless docking center 120 (606). In some other examples, wireless dockee 110 may supply the or include the passphrase in one or more docking protocol messages. In various examples, wireless dockee 110 may receive the passphrase as user input (604). Wireless dockee 110 may store the passphrase to be used for authentication with the wireless docking service for later use.

Based on the passphrase received in the REQUEST_SESSION ASP communication or the wireless docking protocol messages, wireless docking center 120 determines whether wireless dockee 110 is authorized to access the wireless docking service, determines one or more peripheral function services that wireless dockee 110 may access. Because the passphrase is encrypted using link layer encryption, third parties may not intercept the passphrase during transmission.

To determine whether wireless dockee 110 is authorized to access peripheral function services, wireless docking center 120 determines whether the received passphrase, and in some examples, the MAC address of wireless dockee 110 match the a passphrase and/or MAC address stored in one or more of a database, file, or another data store, such as a data store of a network device or a computing device located in a remote network (e.g. a cloud).

If wireless docking center 120 determines that wireless dockee 110 is not authorized to access the wireless docking service based on the received passphrase, i.e. because the received passphrase and the one or more stored passphrases do not match, wireless docking center 120 rejects the session request, and denies access to the docking service and peripheral function services. If wireless docking center 120 determines that wireless dockee 110 is authorized to access the wireless docking services, wireless docking center 120 may grant wireless dockee 110 access to wireless docking services, and may setup and establish a session for the wireless docking service.

Responsive to establishing a wireless docking service session, wireless dockee 110 and wireless docking center 120 may determine a set of peripheral function services that wireless dockee 110 is permitted to access based on the passphrase and MAC address of wireless dockee 110. Wireless dockee 110 may determine the set of accessible peripheral function services based on data stored in a database or file, or other data store, as described above.

Wireless dockee 110 and wireless docking center 120 engage in docking protocol messaging. During docking protocol messaging, wireless docking center 120 may send messages to wireless dockee 110 indicating which peripheral function services, e.g. print, storage, etc. services are available for wireless dockee 110 to access based on access permissions associated with the previously supplied passphrase.

In some examples, wireless docking center 120 may generate a passphrase for one or peripheral function services, e.g. of peripherals 140, 142, 144 responsive to establishing a wireless docking service session. The generated passphrase may be different for each accessible peripheral function service, and wireless docking center 120 may transmit the passphrase to wireless dockee 110 (608).

Wireless dockee 110 may seek to access the peripheral function services once wireless docking service setup completes, and may perform ASP P2P device/service discovery for an accessible peripheral function service. Wireless dockee 110 transmits an ASP SESSION_REQUEST message to access the peripheral function service. In accordance with the techniques of this disclosure, the ASP SESSION_REQUEST used for authenticating with a peripheral function service of peripherals 140, 142, 144, may include a passphrase that wireless dockee 110 may have previously received from wireless docking center 120. In some other examples, to authenticate with one or more peripheral function services, wireless dockee 110 may supply a passphrase in one or more peripheral function service protocol messages.

Based on the passphrase supplied ASP SESSION_REQUEST or in the peripheral function service protocol messages, wireless docking center 120 may permit or deny access to the peripheral function. If wireless docking center 120 is permitted to access the peripheral function service, wireless docking center 120 establishes a session, and wireless dockee 110 may communicate wirelessly with a peripheral, such as peripheral 140 using the associated peripheral function service. If access is not permitted, wireless docking center 120 denies access to the peripheral function service.

Figure 6:
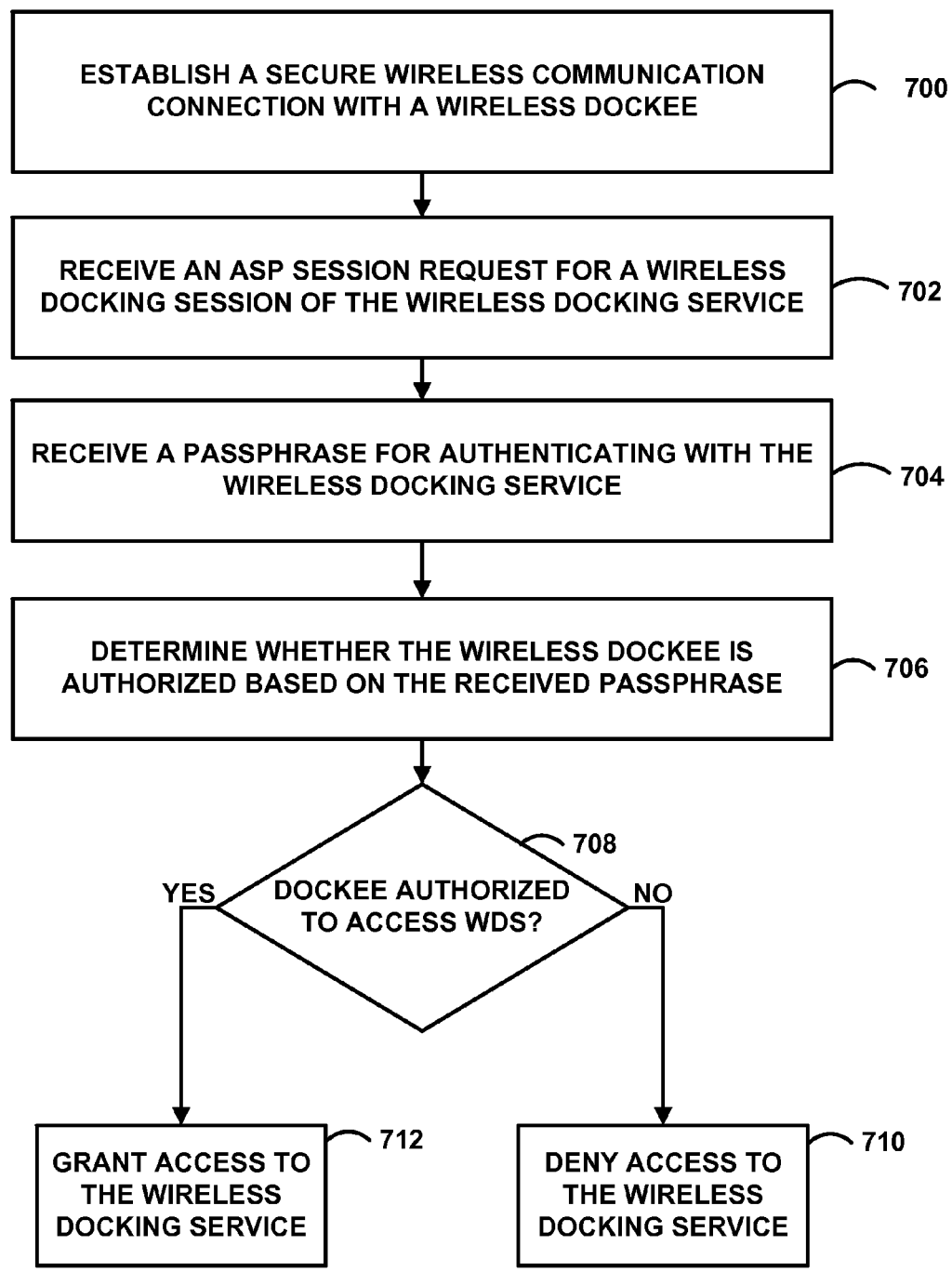
FIG. 6 is a flowchart illustrating an example method for authenticating a wireless dockee with a wireless docking service of a wireless docking center in accordance with the techniques of this disclosure.

FIG. 6 is a flowchart illustrating an example method for authenticating a wireless dockee with a wireless docking service of a wireless docking center in accordance with the techniques of this disclosure. The method of FIG. 6 may correspond to some examples of actions performed by wireless docking center 120 implementing Wireless Docking Service 242A in docking session procedure 500 of FIG. 4, and/or implementing the actions illustrated in FIG. 5 among other examples disclosed herein, and may be performed by a wireless docking center 120, in some examples.

In the method illustrated in FIG. 6, wireless docking center 120 may establish, a secure wireless communication connection with wireless dockee 110 (700). Wireless docking center 120 may receive from wireless dockee 110, an ASP session request for a wireless docking service of wireless docking center 120 (702). Wireless docking center 120 may further receive a passphrase for authenticating with the wireless docking service from wireless dockee 110 (704). In various examples, the ASP session request may comprise an ASP SESSION_REQUEST message.

Wireless docking center 120 may further determine whether wireless dockee 110 is authorized to access the wireless docking service based on the received passphrase (706). In some examples, wireless docking center 120 may receive the passphrase in one or more docking protocol messages. Responsive to determining that wireless dockee 110 is authorized to access the wireless docking service ("YES" branch of decision block 708), wireless docking center 120 may deny wireless dockee 110 access to the wireless docking service (710). Responsive to determining that wireless dockee 110 is not authorized to access the wireless docking service ("NO" branch of decision block 708), wireless docking center 120 may deny wireless dockee 110 access to the wireless docking service (712).

In various examples, wireless docking center 120 establish a session of the wireless docking service responsive to determining that wireless dockee 110 is authorized to access the wireless docking service, and to receive the passphrase for authenticating with the wireless docking service, wireless docking center 120 further configured to receive the passphrase as part of receiving the ASP session request. In other examples, wireless docking center 120 may be configured to establish a session of the wireless docking service, wherein to receive the passphrase, wireless docking center 120 may be configured to receive the passphrase as part of a docking protocol message.

In some examples, wireless docking center 120 may transmit the passphrase to wireless dockee 110 via the secure wireless connection before receiving the passphrase from the wireless dockee.

In some examples, to authenticate, wireless docking center 120 may further determine whether the passphrase matches one or more passphrases stored at wireless docking center 120, and responsive to determining that the passphrase matches one of the one or more passphrases, wireless docking center 120 may determine that wireless dockee 110 is authorized to access the wireless docking service. Responsive to determining that the passphrase does not match one of the one or more passphrases, wireless docking center 120 may determine that wireless dockee 110 is not authorized to access the wireless docking service.

In some examples of the method of FIG. 6, wireless docking center 120 may further receive an ASP session request for a peripheral function service associated with a peripheral that is communicatively coupled with wireless docking center 120, and may receive a passphrase for authenticating with the requested peripheral function service. Wireless docking center 120 may determine whether the wireless dockee is authorized to access the peripheral function service based on the received passphrase for the peripheral function service. Responsive to determining that wireless dockee 110 is authorized to access the wireless docking service, wireless docking center 120 may establish a session of the peripheral function service, and responsive to determining that wireless dockee is not authorized to access the wireless docking service, wireless docking center 120 may deny access to the peripheral function service.

In some examples, the ASP session request for the peripheral function service comprises an ASP SESSION_RE-QUEST message. In some examples, wireless docking center 120 may transmit the passphrase for the peripheral function service to wireless dockee 110 before receiving the passphrase for the peripheral function service from wireless dockee 110.

In other examples, to determine whether wireless dockee 110 is authorized to access the wireless docking service, wireless docking center 120 may further whether wireless dockee 110 is authorized to access the wireless docking service based on a media access control (MAC) address.

In still other examples, to establish a secure wireless connection, wireless dockee 120 may generate credentials for securing the wireless connection and transmit the generated credentials to wireless dockee 110 using at least one of: wireless protected setup (WPS), and near field communications (NFC).

Figure 7:
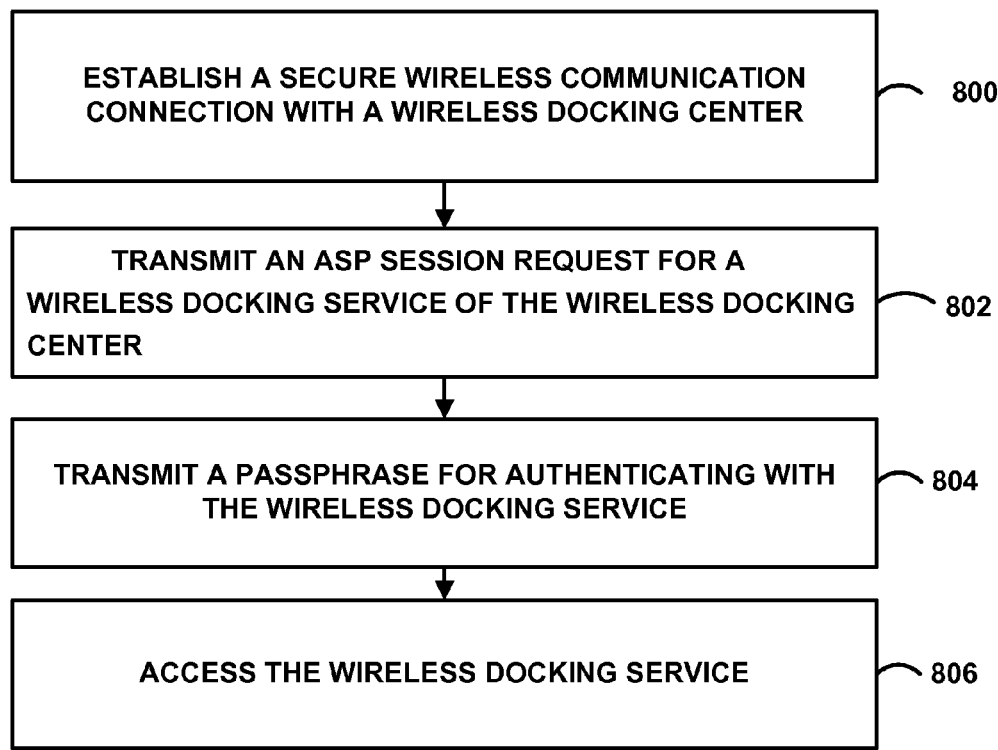
FIG. 7 is a flowchart illustrating an example method for authenticating a wireless dockee with a wireless docking service of a wireless docking center in accordance with the techniques of this disclosure.

FIG. 7 is a flowchart illustrating an example method for authenticating a wireless dockee with a wireless docking service of a wireless docking center in accordance with the techniques of this disclosure. The method of FIG. 7 may correspond to some examples of actions performed by wireless dockee 110 implementing Wireless Docking Service 242B in docking session procedure 500 of FIG. 4, and/or implementing the actions illustrated in FIG. 5 among other examples disclosed herein, and may be performed by a wireless docking center 120, in some examples.

In the method illustrated in FIG. 7, wireless dockee 110 may establish secure wireless communication connection with wireless docking center 120 (800). Wireless dockee 110 may transmit an ASP session request for a wireless docking service of wireless docking center 120 (802). Wireless dockee 110 may further transmit to wireless docking center 120, a passphrase for authenticating with the wireless docking service (804), and may access the wireless docking service (806). In some examples, wireless dockee 110 may be further configured to transmit an ASP session request for a peripheral function service associated with a peripheral that is communicatively coupled with wireless docking center 120, transmit a passphrase for authenticating with the peripheral function service, and establish a session of the peripheral function service. Wireless dockee 110 may receive, from wireless docking center 120, the passphrase for the peripheral function service before transmitting the passphrase for authenticating with the peripheral function service from the wireless dockee, in some examples.

In various examples, the ASP session request for the wireless docking service and/or the peripheral function service may comprise an ASP SESSION_REQUEST message. In some examples, wireless dockee 110 may receive an acknowledgement from wireless docking center 120 that wireless dockee 110 is authorized to access the wireless docking service, and wireless dockee 110 may establish the session responsive to receiving the acknowledgement.

In one example, wireless dockee 110 may be further configured to establish a session of the wireless docking service responsive to determining that the wireless dockee is authorized to access the wireless docking service, and to receive the passphrase for authenticating with the wireless docking service, wireless dockee 110 further configured to receive the passphrase as part of receiving the ASP session request. In another example, wireless dockee 110 may be further configured to establish a session of the wireless docking service, and to receive the passphrase wireless dockee 110 may receive the passphrase as part of a docking protocol message.

In various examples, wireless dockee 110 may receive the passphrase for authenticating with the wireless docking service from wireless docking center 120 via the secure wireless connection before transmitting the ASP session request to wireless docking center 120. In some examples, to access the wireless docking service, the wireless dockee 110 may establish a session of the wireless docking service, and to transmit the passphrase for authenticating with the wireless docking service wireless dockee 110 may transmit the passphrase as part of transmitting the ASP session request. In some other examples wireless dockee 110 may receive, from wireless docking center 120, an acknowledgement that wireless dockee 110 is authorized to access the wireless docking service, and to establish the session of the wireless docking session, wireless docking center 120 may establish the session of the wireless docking responsive to receiving the acknowledgement.

In some other examples, wireless dockee 110 may establish the session of the wireless docking service, and to transmit the passphrase for authenticating with the wireless docking service, wireless dockee 110 may transmit the passphrase as part of a docking protocol message. In some other examples, wireless dockee 110 receive the passphrase from the wireless docking center via the secure wireless connection before transmitting the passphrase for authenticating with the wireless docking service.

In yet other examples, to establish a secure communication session, wireless dockee 110 may receive credentials for securing the wireless connection, wherein receiving the credentials comprises at least one of: receiving, from the wireless docking center, the credentials using wireless protected setup (WPS), receiving from the wireless docking center, the credentials using near field communications (NFC), and receiving, the wireless credentials. In yet another example, wireless dockee 110 may receive a user input comprising the passphrase for authenticating with the wireless docking service before transmitting the passphrase to wireless docking center 120.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   establishing, by a wireless docking center, a secure wireless communication connection with a wireless dockee;
   receiving, by the wireless docking center, from the wireless dockee, an application service platform (ASP) session request for a wireless docking service of the wireless docking center;
   receiving, by the wireless docking center, from the wireless dockee, a first passphrase for authenticating with the wireless docking service;
   determining, by the wireless docking center, whether the wireless dockee is authorized to access the wireless docking service based on the received first passphrase;
   responsive to determining that the wireless dockee is not authorized to access the wireless docking service, denying, by the wireless docking center, the wireless dockee access to the wireless docking service;

responsive to determining that the wireless dockee is authorized to access the wireless docking service, granting, by the wireless docking center, the wireless dockee access to the wireless docking service;

responsive to determining that the wireless dockee is authorized to access the wireless docking service, establishing, by the wireless docking center, a session of the wireless docking service, wherein receiving the first passphrase for authenticating with the wireless docking service comprises receiving the first passphrase as part of receiving the ASP session request;

receiving, by the wireless docking center, an ASP session request for a peripheral function service associated with a peripheral that is communicatively coupled with the wireless docking center;

receiving, by the wireless docking center, a second passphrase for authenticating with the requested peripheral function service;

determining, by the wireless docking center, whether the wireless dockee is authorized to access the peripheral function service based on the received second passphrase for the peripheral function service;

responsive to determining that the wireless dockee is authorized to access the wireless docking service, establishing a session of the peripheral function service; and responsive to determining that wireless dockee is not authorized to access the wireless docking service, denying access to the peripheral function service.

2. The method of claim 1, further comprising:
establishing, by the wireless docking center, a session of the wireless docking service,
wherein receiving the first passphrase comprises receiving the first passphrase as part of a docking protocol message.

3. The method of claim 1, further comprising:
transmitting, by the wireless docking center, the first passhrase to the dockee via the secure wireless connection before receiving the first passphrase from the wireless dockee.

4. The method of claim 1, wherein determining whether the wireless dockee is authorized to access the wireless docking service further comprises:
determining whether the received first passphrase matches one or more passphrases stored at the wireless docking center; and
responsive to determining that the first passphrase matches one of the one or more passphrases, determining, by the wireless docking center, that the wireless dockee is authorized to access the wireless docking service.

5. The method of claim 1, wherein the ASP session request for the wireless docking service comprises an ASP SESSION_REQUEST message.

6. The method of claim 1 further comprising:
transmitting, by the wireless docking center, the second passphrase for authenticating with the peripheral function service, to the wireless dockee before receiving the second passphrase for the peripheral function service from the wireless dockee.

7. The method of claim 1, wherein determining whether the wireless dockee is authorized to access the wireless docking service further comprises determining, by the wireless docking center, whether the wireless dockee is authorized to access the wireless docking service based on a media access control (MAC) address.

8. The method of claim 1, wherein establishing the secure wireless connection further comprises:

generating, by the wireless docking center, credentials for securing the wireless connection and transmitting, by the wireless docking center, to the wireless dockee, the generated credentials using at least one of:
wireless protected setup (WPS) and near field communications (NFC).

9. A method comprising:
establishing, by a wireless dockee, a secure wireless communication connection with a wireless docking center;
transmitting, by the wireless dockee, to the wireless docking center, an application service platform (ASP) session request for a wireless docking service of the wireless docking center;
transmitting, by the wireless dockee, to the wireless docking center, a first passphrase for authenticating with the wireless docking service;
accessing the wireless docking service based on the received first passphrase,
wherein accessing the wireless docking service comprises establishing, by the wireless dockee, a session of the wireless docking service, and
wherein transmitting the first passphrase for authenticating with the wireless docking service comprises receiving the first passphrase as part of transmitting the ASP session request;
transmitting, by the wireless dockee, an ASP session request for a peripheral function service associated with a peripheral that is communicatively coupled with the wireless docking center;
transmitting, by the wireless dockee, a second passphrase for authenticating with the peripheral function service; and
establishing, by the wireless dockee, a session of the peripheral function service based on the received second passphrase for the peripheral function service.

10. The method of claim 9, further comprising:
receiving, by the wireless dockee, from the wireless docking center, an acknowledgement that the wireless dockee is authorized to access the wireless docking service,
wherein establishing the session of the wireless docking session comprises establishing, by the wireless dockee, the session of the wireless docking responsive to receiving the acknowledgement.

11. The method of claim 9, further comprising:
establishing, by the wireless dockee, the session of the wireless docking service,
wherein transmitting the first passphrase for authenticating with the wireless docking service comprises transmitting the first passphrase as part of a docking protocol message.

12. The method of claim 9, further comprising:
receiving, by the wireless dockee, the first passphrase from the wireless docking center via the secure wireless connection before transmitting the first passphrase for authenticating with the wireless docking service.

13. The method of claim 9, wherein the ASP session request for the wireless docking service comprises an ASP SESSION_REQUEST message.

14. The method of claim 9, wherein the ASP session request for the peripheral function service comprises an ASP SESSION_REQUEST message.

15. The method of claim 9, further comprising:
receiving, by the wireless dockee, from the wireless docking center, the second passphrase for the peripheral function service before transmitting the second passphrase for authenticating with the peripheral function service from the wireless dockee.

16. The method of claim 9, wherein establishing a secure wireless connection further comprises: receiving, by the wireless dockee, credentials for securing the wireless connection, wherein receiving the credentials comprises at least one of: receiving, by the wireless dockee, from the wireless docking center, the credentials using wireless protected setup (WPS),
receiving, by the wireless dockee, from the wireless docking center, the credentials using near field communications (NFC), and receiving, by the wireless dockee as user input, the wireless credentials.

17. The method of claim 9, further comprising:
receiving, by the wireless dockee, a user input comprising the first passphrase for authenticating with the wireless docking service before transmitting the first passphrase to the wireless docking center.

18. A device comprising a wireless docking center comprising: a memory; and at least one processor configured to:
establish a secure wireless communication connection with a wireless dockee;
receive from the wireless dockee, an application service platform (ASP) session request for a wireless docking service of the wireless docking center;
receive, from the wireless dockee, a first passphrase for authenticating with the wireless docking service;
determine whether the wireless dockee is authorized to access the wireless docking service based on the received first passphrase;
responsive to determining that the wireless dockee is not authorized to access the wireless docking service, deny the wireless dockee access to the wireless docking service;
responsive to determining that the wireless dockee is authorized to access the wireless docking service, grant the wireless dockee access to the wireless docking service;
establish a session of the wireless docking service responsive to determining that the wireless dockee is authorized to access the wireless docking service,
wherein to receive the first passphrase for authenticating with the wireless docking service, the at least one processor is further configured to receive the first passphrase as part of receiving the ASP session request;
receive an ASP session request for a peripheral function service associated with a peripheral that is communicatively coupled with the wireless docking center; receive a second passphrase for authenticating with the requested peripheral function service;
determine whether the wireless dockee is authorized to access the peripheral function service based on the received second passphrase for the peripheral function service; establish a session of the peripheral function service responsive to determining that the wireless dockee is authorized to access the wireless docking service; and
deny access to the peripheral function service responsive to determining that wireless dockee is not authorized to access the wireless docking service.

19. The device of claim 18, where in the at least one processor is further configured to:
establish a session of the wireless docking service,
wherein to receive the first passphrase the at least one processor is configured to receive the first passphrase as part of a docking protocol message.

20. The device of claim 18, wherein the at least one processor is configured to:
transmit the first passphrase to the dockee via the secure wireless connection before receiving the first passphrase from the wireless dockee.

21. The device of claim 18, wherein to determine whether the wireless dockee is authorized to access the wireless docking service, the at least one processor is configured to determine whether the first passphrase matches one or more passphrases stored at the wireless docking center; and
determine that the wireless dockee is authorized to access the wireless docking service responsive to determining that the first passphrase matches one of the one or more passphrases.

22. The device of claim 18, wherein the ASP session request for the wireless docking service comprises an ASP SESSION_REQUEST message.

23. The device of claim 18, wherein the at least one processor is configured to:
transmit the second passphrase for authenticating with the peripheral function service to the wireless dockee before receiving the second passphrase for the peripheral function service from the wireless dockee.

24. The device of claim 18, wherein to determine whether the wireless dockee is authorized to access the wireless docking service, the at least one processor is further configured to determine whether the wireless dockee is authorized to access the wireless docking service based on a media access control (MAC) address.

25. The device of claim 18, wherein to establish a secure wireless connection, the at least one processor is configured to:
generate credentials for securing the wireless connection and transmit the generated credentials using at least one of:
wireless protected setup (WPS) and near field communications (NFC).

26. A device comprising a wireless dockee comprising:
a memory; and
at least one processor configured to:
establish a secure wireless communication connection with a wireless docking center;
transmit to the wireless docking center, an application service platform (ASP) session request for a wireless docking service of the wireless docking center;
transmit to the wireless docking center, a first passphrase for authenticating with the wireless docking service;
access the wireless docking service based on the received first passphrase,
wherein to access the wireless docking service, the at least one processor is configured to establish a session of the wireless docking service, and
wherein to transmit the first passphrase for authenticating with the wireless docking service, the at least one processor is configured to transmit the first passphrase as part of transmitting the ASP session request;
transmit an ASP session request for a peripheral function service associated with a peripheral that is communicatively coupled with the wireless docking center;
transmit a second passphrase for authenticating with the peripheral function service; and
establish a session of the peripheral function service based on the received second passphrase for the peripheral function service.

27. The device of claim 26, wherein the at least one processor is configured to:
receive, from the wireless docking center, an acknowledgement that the wireless dockee is authorized to access the wireless docking service, wherein to establish the session of the wireless docking session, the at least one processor is configured to establish the session of the wireless docking responsive to receiving the acknowledgement.

28. The device of claim 26, wherein the at least one processor is configured to:
establish the session of the wireless docking service,
wherein to transmit the first passphrase for authenticating with the wireless docking service, the at least one processor is configured to transmit the first passphrase as part of a docking protocol message.

29. The device of claim 26, wherein the at least one processor is further configured to:
receive the first passphrase from the wireless docking center via the secure wireless connection before transmitting the first passphrase for authenticating with the wireless docking service.

30. The device of claim 26, wherein the ASP session request for the wireless docking service comprises an ASP SESSION_REQUEST message.

31. The device of claim 26, wherein the ASP session request for the peripheral function service comprises an ASP SESSION_REQUEST message.

32. The device of claim 26, wherein the at least one processor is further configured to:
receive, from the wireless docking center, the second passphrase for the peripheral function service before transmitting the second passphrase for authenticating with the peripheral function service from the wireless dockee.

33. The device of claim 26, wherein to establish a secure wireless connection, the at least one processor is further configured to:
receive wireless dockee, credentials for securing the wireless connection, wherein receiving the credentials comprises at least one of:
receiving, from the wireless docking center, the credentials using wireless protected setup (WPS),
receiving, from the wireless docking center, the credentials using near field communications (NFC), and
receiving, as user input, the wireless credentials.

34. A wireless docking center comprising:
means for establishing a secure wireless communication connection with a wireless dockee;
means for receiving from the wireless dockee, an application service platform (ASP) session request for a wireless docking service of the wireless docking center;
means for receiving from the wireless dockee, a first passphrase for authenticating with the wireless docking service;
means for determining whether the wireless dockee is authorized to access the wireless docking service based on the received first passphrase;
means for denying, by the wireless docking center, the wireless dockee access to the wireless docking service responsive to determining that the wireless dockee is not authorized to access the wireless docking service;
means for granting, by the wireless docking center, the wireless dockee access to the wireless docking service responsive to determining that the wireless dockee is authorized to access the wireless docking service;
means for establishing a session of the wireless docking service responsive to determining that the wireless dockee is authorized to access the wireless docking service,
wherein the means for receiving the first passphrase for authenticating with the wireless docking service comprises means for receiving the first passphrase as part of receiving the ASP session request;
means for receiving an ASP session request for a peripheral function service associated with a peripheral that is communicatively coupled with the wireless docking center;
means for receiving a second passphrase for authenticating with the requested peripheral function service;
means for determining whether the wireless dockee is authorized to access the peripheral function service based on the received second passphrase for the peripheral function service;
means for establishing a session of the peripheral function service responsive to determining that the wireless dockee is authorized to access the wireless docking service; and
means for denying access to the peripheral function service responsive to determining that wireless dockee is not authorized to access the wireless docking service.

35. The device of claim 34, further comprising:
means for establishing a session of the wireless docking service,
wherein the means for receiving the first passphrase comprises means for receiving the first passphrase as part of a docking protocol message.

36. A device comprising:
means for establishing a secure wireless communication connection with a wireless docking center;
means for transmitting, to the wireless docking center, an application service platform (ASP) session request for a wireless docking service of the wireless docking center;
means for transmitting, to the wireless docking center, a first passphrase for authenticating with the wireless docking service;
means for accessing the wireless docking service based on the received first passphrase;
wherein the means for accessing the wireless docking service comprises means for establishing a session of the wireless docking service, and
wherein the means for transmitting the first passphrase for authenticating with the wireless docking service comprises means for receiving the first passphrase as part of transmitting the ASP session request;
means for transmitting an ASP session request for a peripheral function service associated with a peripheral that is communicatively coupled with the wireless docking center;
means for transmitting a second passphrase for authenticating with the peripheral function service; and
means for establishing a session of the peripheral function service based on the received second passphrase for the peripheral function service.

37. The device of claim 36, further comprising:
means for establishing, by the wireless dockee, the session of the wireless docking service,
wherein the means for transmitting the first passphrase for authenticating with the wireless docking service comprises means for transmitting the first passphrase as part of a docking protocol message.

38. A non-transitory computer-readable storage medium comprising instructions, that, when executed, cause at least one processor to:
establish a secure wireless communication connection with a wireless dockee;
receive, from the wireless dockee, an application service platform (ASP) session request for a wireless docking service of the wireless docking center;
receive, from the wireless dockee, a first passphrase for authenticating with the wireless docking service;

determine whether the wireless dockee is authorized to access the wireless docking service based on the received first passphrase;

responsive to determining that the wireless dockee is not authorized to access the wireless docking service, deny the wireless dockee access to the wireless docking service;

responsive to determining that the wireless dockee is authorized to access the wireless docking service, grant the wireless dockee access to the wireless docking service;

establish a session of the wireless docking service responsive to determining that the wireless dockee is authorized to access the wireless docking service, wherein the instructions that cause the at least one processor to receive the first passphrase for authenticating with the wireless docking service further comprise instructions that cause the at least one processor to receive the first passphrase as part of receiving the ASP session request;

receive an ASP session request for a peripheral function service associated with a peripheral that is communicatively coupled with the wireless docking center;

receive a second passphrase for authenticating with the requested peripheral function service;

determine whether the wireless dockee is authorized to access the peripheral function service based on the received second passphrase for the peripheral function service;

establish a session of the peripheral function service responsive to determining that the wireless dockee is authorized to access the wireless docking service; and deny access to the peripheral function service responsive to determining that wireless dockee is not authorized to access the wireless docking service.

39. The non-transitory computer-readable storage medium of claim 38, further comprising instructions that cause the at least one processor to:

transmit the first passphrase to the dockee via the secure wireless connection before receiving the first passphrase from the wireless dockee.

40. A non-transitory computer-readable storage medium comprising instructions, that, when executed, cause at least one processor to:

establish a secure wireless communication connection with a wireless docking center;

transmit to the wireless docking center, an application service platform (ASP) session request for a wireless docking service of the wireless docking center;

transmit to the wireless docking center, a first passphrase for authenticating with the wireless docking service; and access the wireless docking service based on the received first passphrase;

wherein the instructions that cause the at least one processor to access the wireless docking service cause the at least one processor to establish a session of the wireless docking service, and wherein the instructions that cause the at least one processor to transmit the first passphrase for authenticating with the wireless docking service cause the at least one processor to receive the first passphrase as part of transmitting the ASP session request; and transmit an ASP session request for a peripheral function service associated with a peripheral that is communicatively coupled with the wireless docking center;

transmit a second passphrase for authenticating with the peripheral function service; and establish a session of the peripheral function service based on the received second passphrase for the peripheral function service.

41. The non-transitory computer-readable storage medium of claim 40, further comprising instructions that cause the at least one processor to:

receive, from the wireless docking center, an acknowledgement that the wireless dockee is authorized to access the wireless docking service, wherein the instructions that cause the at least one processor to establish the session of the wireless docking session comprise instructions that cause the at least one processor to establish the session of the wireless docking responsive to receiving the acknowledgement.

\* \* \* \* \*